(12) United States Patent
Karmarkar et al.

(10) Patent No.: US 12,502,954 B2
(45) Date of Patent: Dec. 23, 2025

(54) SYSTEMS FOR A DRIVELINE

(71) Applicant: DANA ITALIA S.R.L., Trentino (IT)

(72) Inventors: Sudatta Karmarkar, Pune (IN); Idris Abbasbhai Poonawala, Pune (IN); Jarret Paul Davis, Maumee, OH (US)

(73) Assignee: DANA ITALIA S.R.L., Arco (IT)

(*) Notice: Subject to any disclaimer, the term of this patent is extended or adjusted under 35 U.S.C. 154(b) by 496 days.

(21) Appl. No.: 18/060,917

(22) Filed: Dec. 1, 2022

(65) Prior Publication Data

US 2024/0181870 A1 Jun. 6, 2024

(51) Int. Cl.
| | |
|---|---|
| *B60K 17/04* | (2006.01) |
| *B60K 1/02* | (2006.01) |
| *B60K 7/00* | (2006.01) |
| *B60L 50/60* | (2019.01) |
| *B62D 11/04* | (2006.01) |
| *F16H 37/04* | (2006.01) |

(52) U.S. Cl.
CPC .......... *B60K 17/046* (2013.01); *B60K 7/0007* (2013.01); *B60L 50/60* (2019.02); *B62D 11/04* (2013.01); *F16H 37/04* (2013.01); *B60K 2007/0061* (2013.01)

(58) Field of Classification Search
CPC ............. B60K 17/046; B60K 7/0007; B60K 2007/0061; B60K 2007/0076; F16H 37/04
See application file for complete search history.

(56) References Cited

U.S. PATENT DOCUMENTS

| | | | |
|---|---|---|---|
| 273,940 A | 3/1883 | Bonninghausen | |
| 7,112,155 B2 | 9/2006 | Keuth | |
| 10,766,361 B2 | 9/2020 | Forrest et al. | |
| 11,707,980 B2 * | 7/2023 | Payne | B60K 17/046 180/65.51 |
| 2014/0371028 A1 | 12/2014 | Billmeyer | |
| 2022/0314782 A1 * | 10/2022 | Shinozaki | B62D 55/125 |

FOREIGN PATENT DOCUMENTS

| | | | | |
|---|---|---|---|---|
| CN | 102139629 B | | 3/2015 | |
| CN | 115143241 A | * | 10/2022 | ........... B60K 17/046 |
| EP | 2127934 A1 | | 12/2009 | |
| WO | 2018034647 A1 | | 2/2018 | |
| WO | 2019014479 A1 | | 1/2019 | |
| WO | WO-2022152447 A1 | * | 7/2022 | ........... B60K 7/0007 |

* cited by examiner

*Primary Examiner* — Tinh Dang

(74) *Attorney, Agent, or Firm* — McCoy Russell LLP

(57) ABSTRACT

Systems are provided for a driveline. In one example, a system includes a first electric motor coupled to a first two-stage gear assembly, a second electric motor coupled to a second two-stage gear assembly and separated from the first electric motor, wherein the first and second two-stage gear assemblies comprise a first stage helical gear assembly and a second stage helical planetary reduction assembly.

20 Claims, 7 Drawing Sheets

SYSTEMS FOR A DRIVELINE

TECHNICAL FIELD

The present description relates generally to device driveline of a vehicle.

BACKGROUND AND SUMMARY

Off-highway vehicles may include a driveline with a power source, a transmission and a drive axle. The power source may be an engine or an electric motor. These drivelines include a large packaging size due to the number of components included and a size of the components.

Some example off-highway vehicles may include two-stage gear assemblies comprising a first stage helical gear and a second stage helical planetary unit. These vehicles may couple a single or multiple electric motors to the gear assemblies. In the example of multiple electric motors, a shaft may be arranged therebetween, which results in increased packaging size and maintenance.

In one example, the issues described above may be at least partially solved by a system including a first electric motor coupled to a first two-stage gear assembly, a second electric motor coupled to a second two-stage gear assembly and separated from the first electric motor, wherein the first and second two-stage gear assemblies comprise a first stage helical gear assembly and a second stage helical planetary reduction gear assembly. By doing this, the electric motors may be operated independently and maintenance thereof may be simplified.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
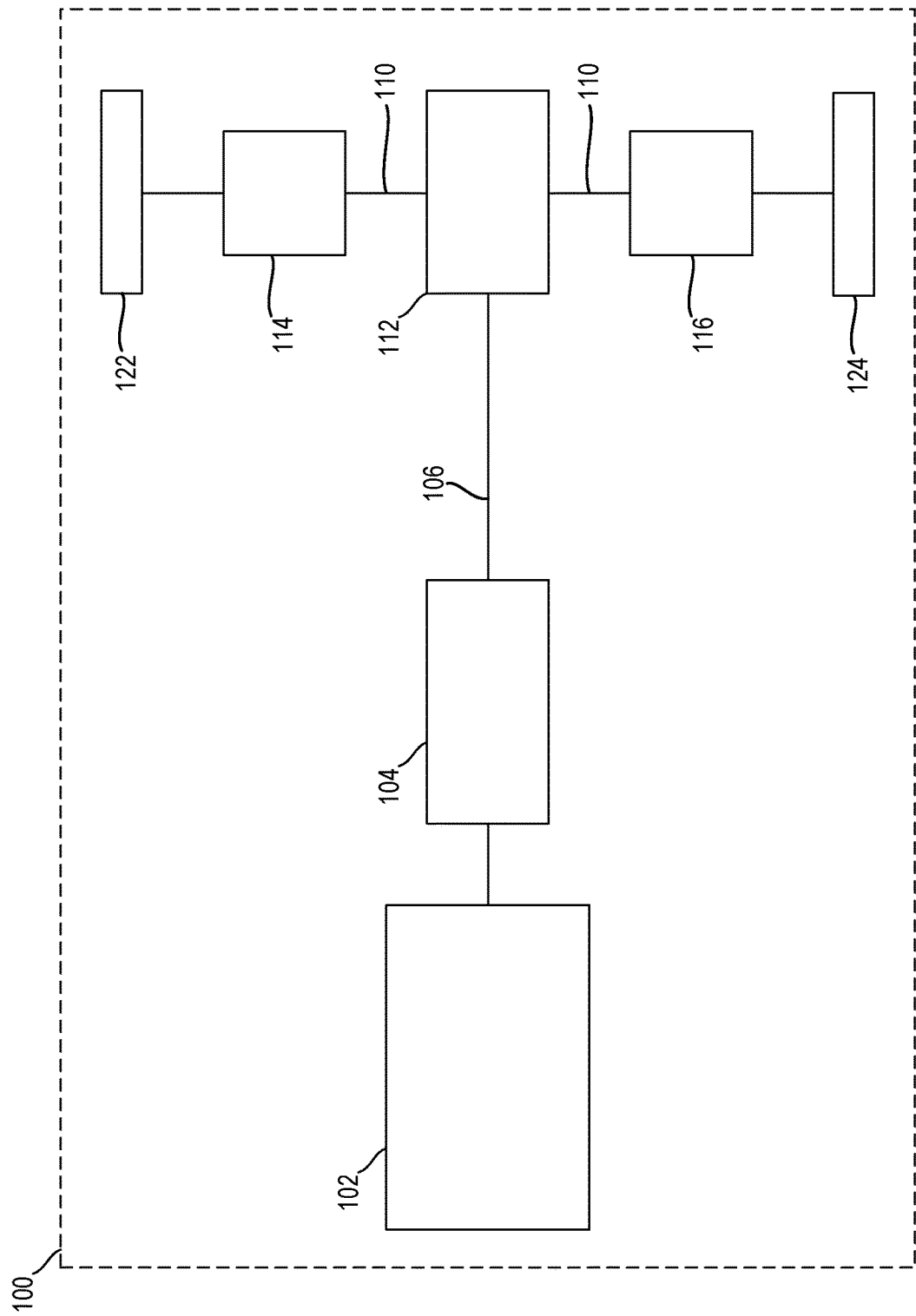
FIG. 1 is a prior art example of an off-highway vehicle with an engine powered driveline.
Figure 2:
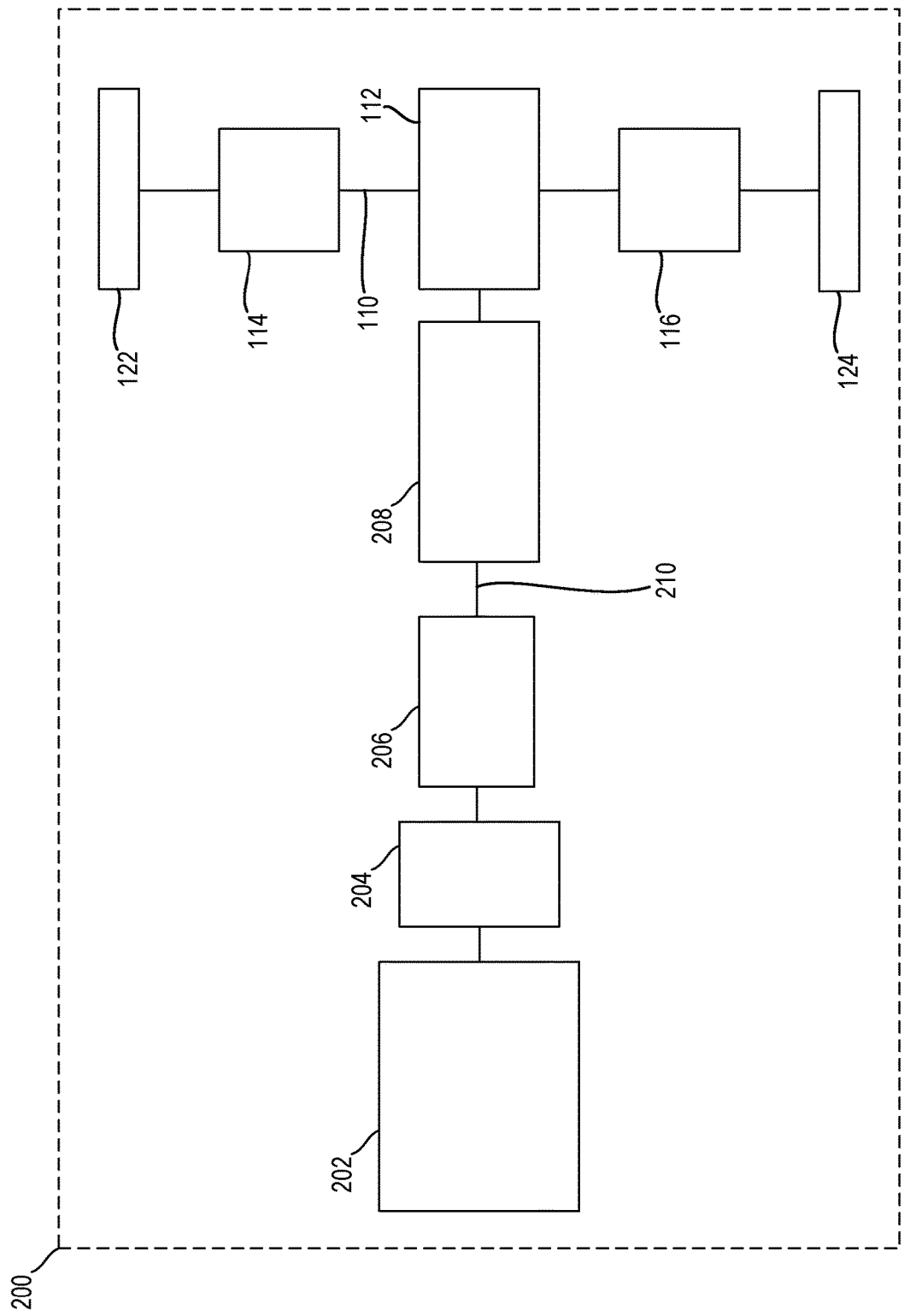
FIG. 2 is a prior art example of an off-highway vehicle with an electric motor powered driveline.
Figure 3:
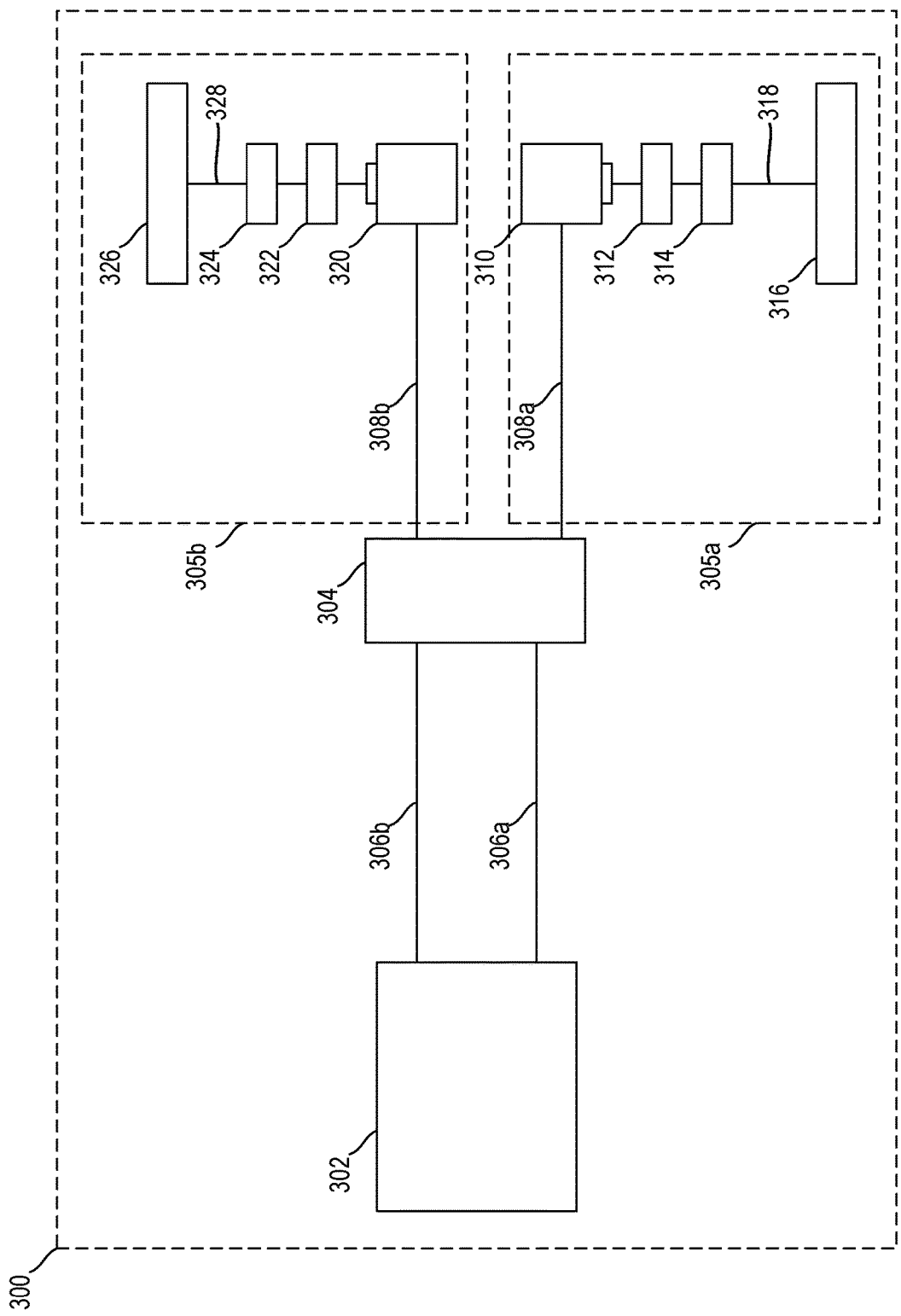
FIG. 3 is an example block diagram of an off-highway vehicle with separate electric motors coupled to multi-stage gear assemblies.
Figure 4:
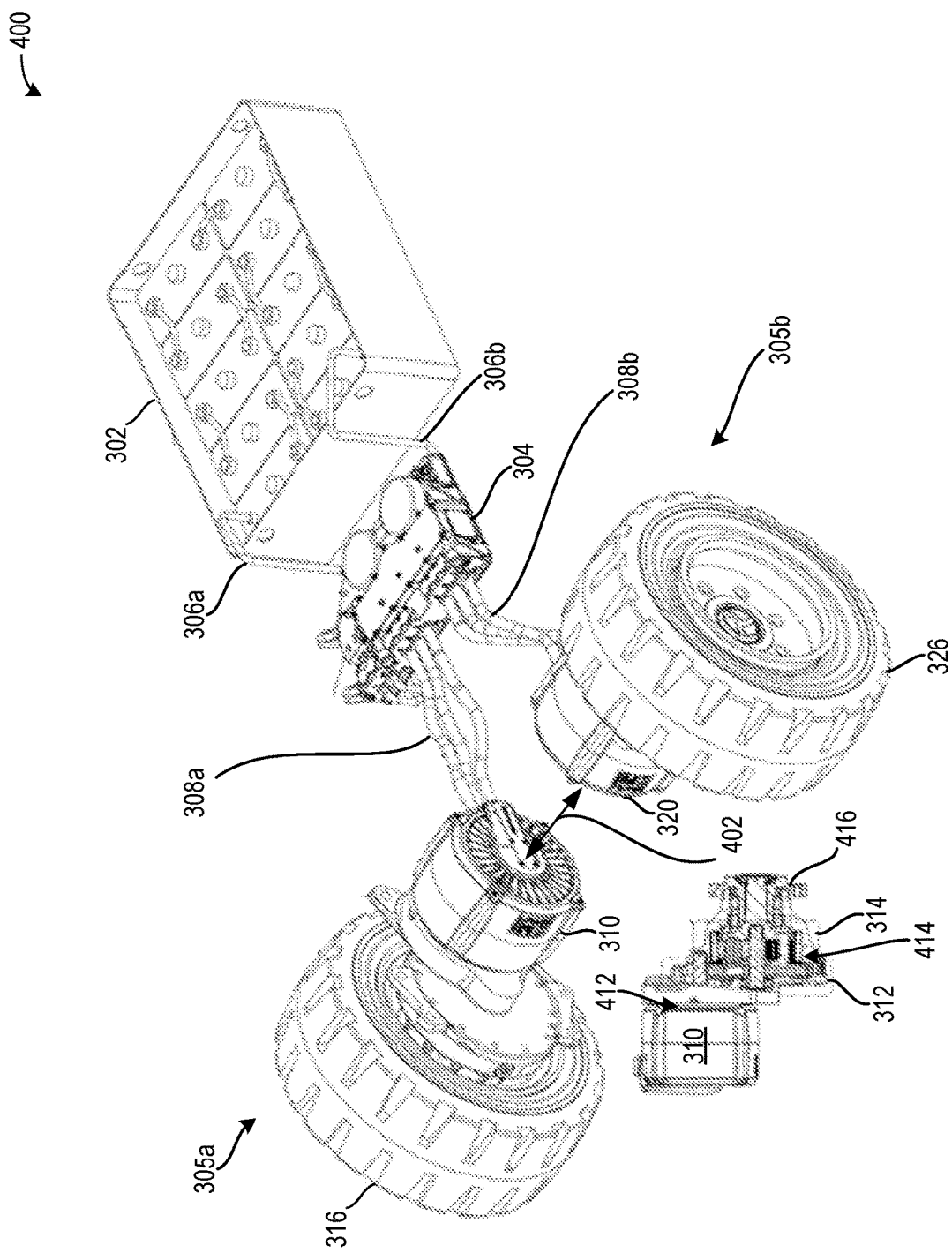
FIG. 4 is an isometric view of the off-highway vehicle with the separate electric motors.
Figure 5:
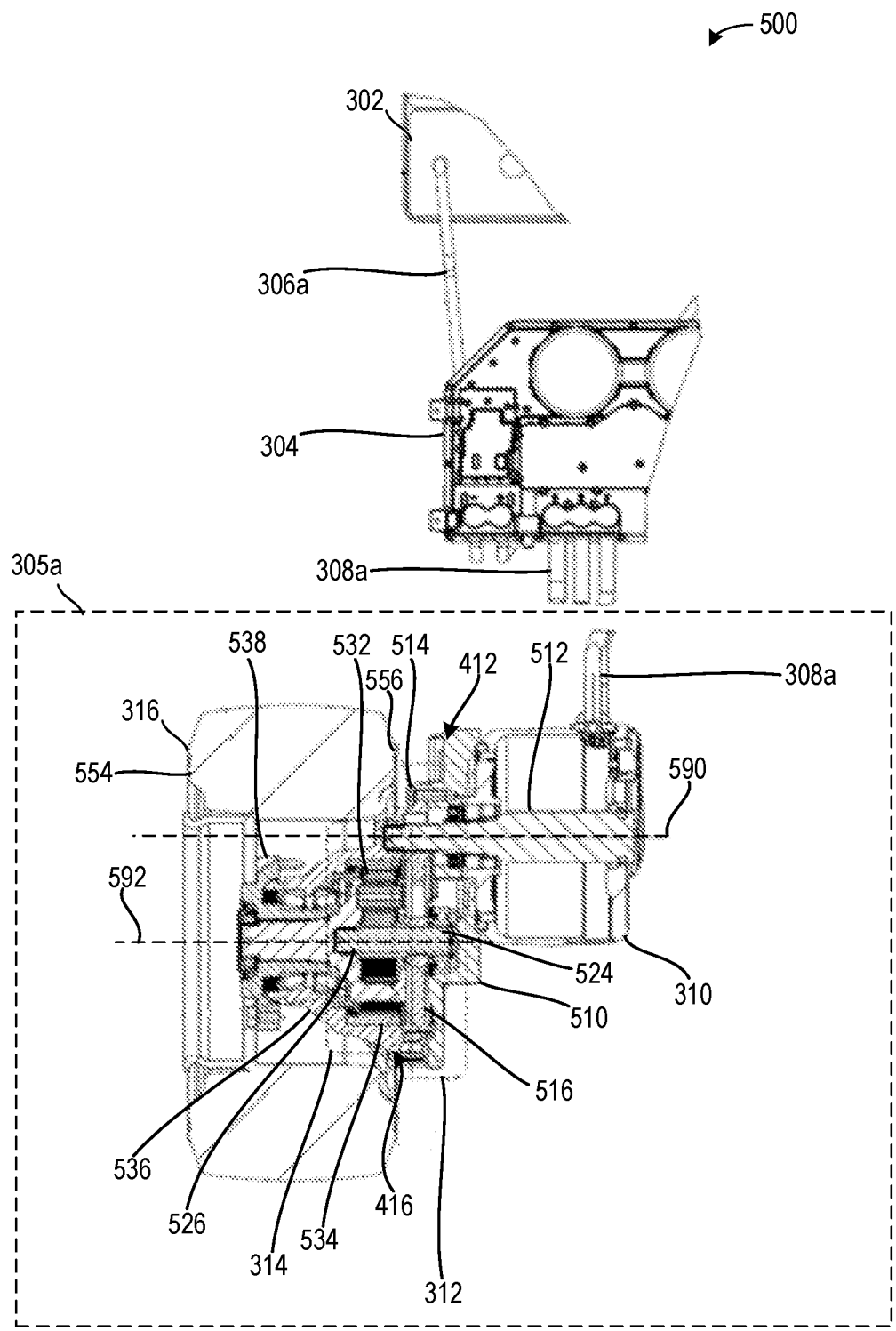
FIG. 5 is a sectional view of one of the separate electric motors of the off-highway vehicle.
Figure 6:
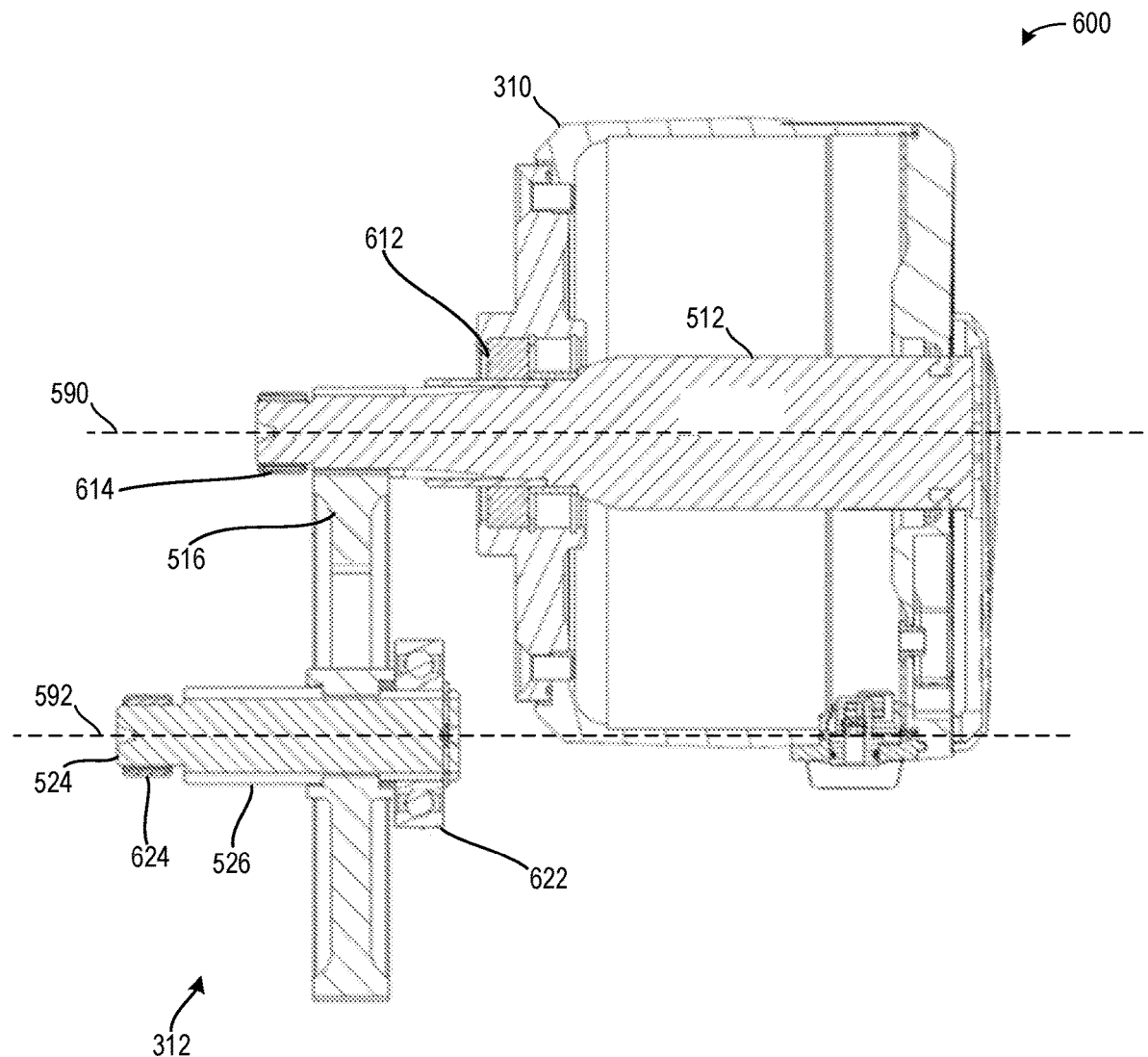
FIG. 6 is a sectional view of a first reduction assembly of the multi-stage gear assembly of the off-highway vehicle.
Figure 7:
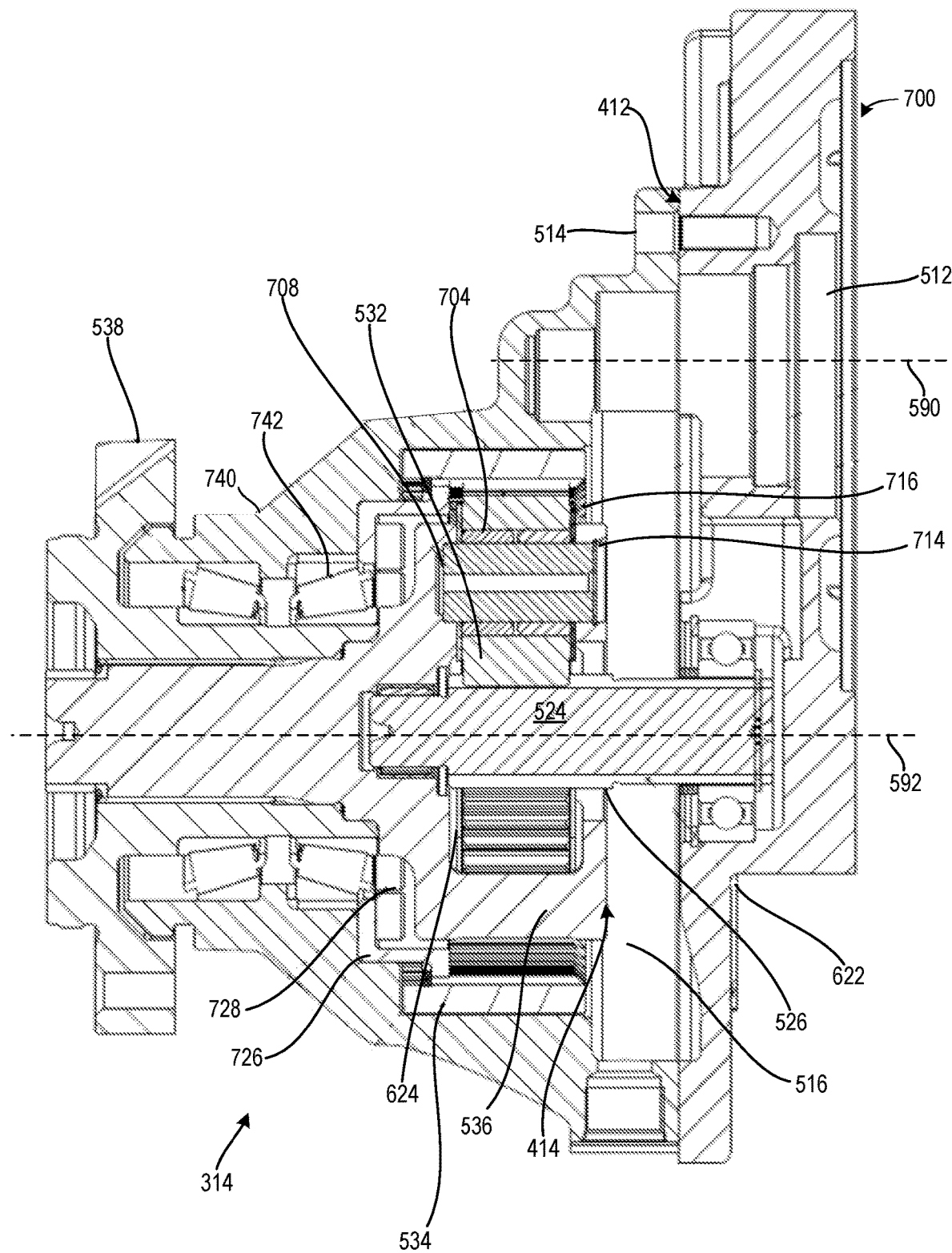
FIG. 7 is a sectional view of a second reduction assembly of the multi-stage gear assembly of the off-highway vehicle.

The following description relates to a driveline of an off-highway vehicle. Prior art examples of a driveline of an off-highway vehicle comprising an engine as a power source and an electric motor as a power source are shown in FIGS. 1 and 2, respectively. FIG. 3 is an example block diagram of an off-highway vehicle with separate electric motors coupled to multi-stage gear assemblies. FIG. 4 is an isometric view of the off-highway vehicle with the separate electric motors. FIG. 5 is a sectional view of one of the separate electric motors of the off-highway vehicle. FIG. 6 is a sectional view of a first reduction assembly of the multi-stage gear assembly of the off-highway vehicle. FIG. 7 is a sectional view of a second reduction assembly of the multi-stage gear assembly of the off-highway vehicle. Herein, an off-highway vehicle may include a vehicle used in commercial applications, such as construction and/or agriculture. Example off-highway vehicles may include forklifts, tractors, tanks, all-terrain vehicles, heavy machines, recreational off-highway vehicles, utility task vehicles, bulldozers, and the like.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 4-7 are shown approximately to scale, however, other dimensions may be used if desired.

Turning now to FIG. 1, an off-highway vehicle 100 according to a prior art example is shown. The off-highway vehicle 100 includes an engine 102 as a power source. The engine 102 is coupled to a transmission 104 via a drive shaft 106. The drive shaft 106 transfers power from the transmission 104 to a differential 112 arranged on a drive axle 110. The differential 112 transfers power to a first final drive 114 and a second final drive 116. In one example, the first final drive 114 and the second final drive 116 are a planetary gear assembly. The first final drive 114 may transmit power to a first wheel 122 of the drive axle 110 and the second final drive 116 may transmit power to a second wheel 124 of the drive axle 110.

The engine 102 and the transmission 104 may be fixed on a chassis. The drive shaft 106 may act as a connecting member between the transmission 104 and differential 112 and transmit power between the two of the vehicle 100. The engine may emit gases, such as carbon dioxide, carbon monoxide, nitrogen oxides, and the like.

Turning now to FIG. 2, an off-highway vehicle 200 according to a prior art example is shown. The off-highway vehicle 200 may be similar to the off-highway vehicle 100 in that it includes the drive axle 110 comprising the differential 112, the first final drive 114, the second final drive 116, the first wheel 122, and the second wheel 124.

The off-highway vehicle 200 further includes an energy storage device 202 coupled to a motor control unit 204. The motor control unit 204 may be coupled to an electric motor 206. The electric motor 206 may transfer power to a transmission 208 via a drive shaft 210. The transmission 208 may be coupled to the differential 112.

Turning now to FIG. 3, a block diagram of a driveline of an off-highway vehicle 300 according to an embodiment of the present disclosure is shown. The off-highway vehicle 300 may comprise a battery pack 302. The battery pack 302 may house a plurality of energy storage devices, such as a plurality of batteries.

The battery pack 302 may be coupled to a motor control unit 304 via a first electric coupling 306a and a second electric coupling 306b. The motor control unit 304 may include a first motor control unit coupled to the first electric coupling 306a and a second motor control unit coupled to the second electric coupling 306b. In one example, the first electric coupling 306a and the second electric coupling 306b are power cables. The motor control unit 304 may be coupled to a first electric motor 310 via a first motor coupling 308a and a second electric motor 320 via a second motor coupling 308b. In one example, the first motor coupling 308a and the second motor coupling 308b are power cables.

In one example, the motor control unit 304 may receive power from the battery pack 302 via the first electric coupling 306a and 306b. DC power may be transferred from the battery pack 302 to the motor control unit 304. Downstream from the motor control unit 304, the driveline may be divided into a first section 305a and a second section 305b. The motor control unit 304 may convert the DC power to AC power, wherein the AC power is transferred through the first motor coupling 308a and the second motor coupling 308b to the first electric motor 310 and the second electric motor 320, respectively. The first motor coupling 308a, electric motor 310, and components coupled to the first electric motor 310 may form the first section 305a. The second motor coupling 308b, second electric motor 320, and components coupled to the second electric motor 320 may form the second section 305b.

The first electric motor 310 may be coupled to a first two-stage reduction gear assembly comprising a first helical gear assembly 312. The first two-stage reduction gear assembly may further comprise a first helical planetary gear assembly 314 coupled to the first helical gear assembly 312. An output of the first helical planetary gear assembly 314 drives a first wheel 316. Each of the first electric motor 310, the first helical gear assembly 312, the first helical planetary gear assembly 314, and the first wheel 316 may be arranged on and mechanically coupled to a first axle 318. In one example, the first axle 318 may be one or more shafts arranged along a single axis or multiple axes.

The second electric motor 320 may be coupled to a second two-stage reduction gear assembly comprising a second helical gear assembly 322. The second two-stage reduction gear assembly may further comprise a second helical planetary gear assembly 324 coupled to the second helical gear assembly 322. The second helical gear assembly 322 and the second helical planetary gear assembly 324 may be identical to the first helical gear assembly 312 and the first helical planetary gear assembly 314, respectively. An output of the second helical planetary gear assembly 324 may drive a second wheel 326. Each of the second electric motor 320, the second helical gear assembly 322, the second helical planetary gear assembly 324, and the second wheel 326 may be arranged on and mechanically coupled to a second axle 328. In one example, the second axle 328 may be one or more shafts arranged along a single axis or multiple axes.

The first electric motor 310 and the second electric motor 320 may be completely separated from one another. In one example, there is no mechanical or other physical coupling element between the first electric motor 310 and the second electric motor 320. The motor control unit 304 may be configured to power each of the first electric motor 310 and the second electric motor 320 independently, such that a speed of the first wheel 316 may be different than a speed of the second wheel 326. In this way, the driveline of the off-highway vehicle 300 may comprise reduced noise, vibration, and harshness and a reduced packaging size relative to the prior art examples of FIGS. 1 and 2.

Turning now to FIG. 4, it shows an embodiment 400 of an isometric view of the battery pack 302, the motor control unit 304, the first electric motor 310, the second electric motor 320, the first wheel 316, and the second wheel 326. As such, component previously introduced may be similarly numbered in this and subsequent figures.

As illustrated in the embodiment 400, the driveline is completely separated downstream of the motor control unit 304 into a first section 305a and a second section 305b. A gap 402 may be located between and separate the first motor 310 from the second motor 320. The first electric motor 310 receives a first supply of AC power and the second electric motor 320 receives a second supply of AC power. The first supply of AC power may be independent of the second supply of AC power and vice-versa. As such, the power received by the first electric motor 310 is not transferred to the second electric motor 320 nor is it used to drive the second electric motor 320, and vice-versa.

Turning now to FIG. 5, it shows a sectional view 500 of the motor control unit 304 and the battery pack 302 fixed on a drive chassis separately from the first helical gear assembly 312 and the first helical planetary gear assembly 314. While the illustration and description of FIG. 5 are directed toward the first electric motor 310 and its corresponding multi-stage reduction assembly, the description may apply to the second electric motor 320 and its corresponding multi-stage reduction assembly.

The first electric motor 310 may include a first motor shaft 512 arranged along a first axis 590. The first motor shaft 512 may be arranged in a motor housing 510, which is coupled to a housing of the multi-stage reduction assembly via coupling elements 514. The coupling elements 514 may include one or more of adhesives, welds, fusions, fasteners, and the like. In one example, the coupling elements 514 are fasteners. An output gear 516 of the first helical gear assembly is mounted on shaft 526 and engaged with a helical pinion 524 (helical pinion 524 is integral to the first motor shaft 512) of the first helical gear assembly 312. In one example, output gear 516 extends along an axis normal to the first axis 590 toward the—sun shaft 526, the sun shaft 526 is arranged on a second axis 592 parallel to the first axis 590. The second axis 592 may be misaligned with the first axis 590.

The helical gear 516 is mounted on the sun shaft 526 and are mechanically coupled together. The sun shaft 526 may output to a plurality of planet gears 532 of the first helical planetary gear assembly 314. The planet gears 532 may surround the sun shaft 526 and output to a ring gear 534. The ring gear 534 is fixed to the housing 536 by connecting elements shown in (FIG. 7) and acts as a reaction member. The planet gears 532 are connected to the planet carrier housing 537 by pins 708. The planet carrier housing 537 is coupled to the spindle 538 by splines. (FIG. 7).

The first wheel 316 may rotate via the first planetary gear assembly spindle 538. As illustrated, the configuration of the driveline may include where the first wheel 316 surrounds an outer circumference of a two-stage gear assembly housing (e.g., gear assembly housing 536 of FIG. 7) and is adjacent to the motor housing 510. That is to say, an outer surface of the first wheel faces an ambient environment and an inner surface of the first wheel 316 faces the motor housing 510.

Turning now to FIG. 6, it shows a detailed sectional view 600 of the first helical gear assembly 312. The detailed sectional view 600 illustrates the helical pinion 524 arranged along the first axis 590 and the pinion 524 is integral to the motor shaft 512. The shaft 512 of the first electric motor 310 may be supported by a first bearing 612 and a second bearing 614. The first bearing 612 may be positioned further from the helical pinion 524 than the second bearing 614. In one example, the first bearing 612 is a ball bearing and the second bearing 614 is a needle bearing.

The output gear 516 engages with the helical pinion 524 and a helical gear mounted on helical gear teeth of a sun gear coupled to the sun shaft 526. The output gear 516 and the sun shaft 526 are mechanically coupled together by helical splines which are part of the sun shaft gear teeth. The sun shaft 526 is supported by bearing 622 and 624. In one example, the first sun shaft assembly support bearing 622 is a ball bearing and the second sun shaft assembly support bearing 624 is a needle bearing. The sun shaft 526 may also be supported by the first helical assembly bearing 622 and spaced away from the second helical assembly bearing 624. The sun shaft coupled to the sun gear is engaged with planet gears of the second stage helical planetary reduction gear assembly.

Turning now to FIG. 7, it shows a detailed view of the first planetary helical assembly 314. The sun shaft 526 may engage with planet gears 532. The planet gears 532 may be supported via planet pins 708, needle rollers 704, snap rings 714, thrust washers 716, and a closed planet carrier housing 537.

The planet gears are configured to rotate about planet pins, wherein the planet pins are fixed via snap rings and do not rotate. A ring gear is actuated via the planet gears. The ring gear is physically coupled to a ring gear support bolted to a fixed housing of the planet gears A first planetary helical assembly ring gear 534, which may be fixed, may receive an output of the planet gears 532. The first planetary helical assembly ring gear 534 may include a ring gear support 726, which is fixed to the housing 536 via a plurality of fasteners 728. The first planetary helical assembly ring gear 534 may mesh with the planet gears 532 configured to rotate on the planet pins 708 and needle rollers 704. The snap rings 714 may block the planet pins 708 from rotating such that they are fixed as the planet gears 532 rotate. The thrust washers 716 may orient the planet gears 532 axially to prevent misalignment.

The closed planet carrier housing 537 may be coupled to a first planetary gear assembly spindle 538 via a spline joint. The first planetary gear assembly spindle 538 may be supported in a gear assembly housing 536. In one example, the first planetary gear assembly spindle 538 may be supported in the gear assembly housing 536 via a set of roller bearings 742. In one example, the set of roller bearings 742 includes a set of taper roller bearings. The first planetary gear assembly spindle 538 may output to the first wheel (e.g., first wheel 316 of FIG. 3).

The disclosure provides support for a system including a first electric motor coupled to a first two-stage gear assembly, a second electric motor coupled to a second two-stage gear assembly and separated from the first electric motor, wherein the first and second two-stage gear assemblies comprise a first stage helical gear assembly and a second stage helical planetary reduction gear assembly. A first example of the system further includes where the first stage helical gear assembly comprises a helical pinion and a helical gear mounted on helical gear teeth of a sun gear. A second example of the system, optionally including the first example, further includes where the sun gear is coupled with an output gear of the first stage reduction. A third example of the system, optionally including one or more of the previous examples, further includes where a sun shaft coupled to the sun gear is engaged with planet gears of the second stage helical planetary reduction gear assembly. A fourth example of the system, optionally including one or more of the previous examples, further includes where the planet gears are configured to rotate about planet pins, wherein the planet pins are fixed via snap rings and do not rotate. A fifth example of the system, optionally including one or more of the previous examples, further includes where a ring gear is fixed to a planet carrier housing and is actuated via the planet gears. A sixth example of the system, optionally including one or more of the previous examples, further includes where the ring gear is physically coupled to a ring gear support bolted to a fixed housing. A seventh example of the system, optionally including one or more of the previous examples, further includes where the planet carrier housing is coupled to a spindle supported in a housing of the first two-stage gear assembly or the second two-stage gear assembly, wherein the spindle drives a first wheel or a second wheel.

The disclosure further provides support for an off-highway vehicle including a battery pack comprising a plurality of batteries, a motor unit electrically coupled to the battery pack, a first electric motor coupled to the motor unit via a first motor coupling, a second electric motor coupled to the motor unit via a second motor coupling, wherein the second electric motor and the first electric motor are separate from one another, a first two-stage gear assembly configured to receive power from an output gear of only the first electric motor, and a second two-stage gear assembly configured to receive power from an output gear of only the second electric motor. A first example of the off-highway vehicle further includes where the first electric motor outputs to a helical pinion of a first helical gear assembly of the first two-stage gear assembly. A second example of the off-highway vehicle, optionally including the first example, further includes where the first helical planet gear assembly comprises a sun shaft configured to output to planet gears of a first helical planetary gear assembly. A third example of the off-highway vehicle, optionally including one or more of the previous examples, further includes where the second electric motor outputs to a helical pinion of a second helical gear assembly of the second two-stage gear assembly. A fourth example of the off-highway vehicle, optionally including one or more of the previous examples, further includes where the second helical planet gear assembly comprises a sun shaft configured to output to planet gears of a second helical planetary gear assembly. A fifth example of the off-highway vehicle, optionally including one or more of the previous examples, further includes where the first electric motor is mounted on only a first axle and the second electric motor is mounted on only a second axle, the first axle and the second axle aligned along a common axis and spaced apart from one another. A sixth example of the off-highway vehicle, optionally including one or more of the previous examples, further includes where the first electric motor drives only a first wheel and the second electric motor drives only a second wheel.

The disclosure further provides support for a driveline of an off-highway vehicle including a battery pack comprising a plurality of batteries, a motor unit electrically coupled to the battery pack, a first electric motor coupled to the motor unit via a first motor coupling, a second electric motor coupled to the motor unit via a second motor coupling, wherein the second electric motor and the first electric motor are separate from one another, a first two-stage gear assembly comprising a first helical gear assembly and a first helical planetary gear assembly, the first helical planet gear assembly configured to receive power from an output gear of only the first electric motor, and a second two-stage gear assembly comprising a second helical gear assembly and a second helical planetary gear assembly, the second helical planet gear assembly configured to receive power from an output gear of only the second electric motor. A first example of the driveline further includes where the first helical planetary gear assembly and the second helical planetary gear assembly comprise planet gears engaged with a ring gear, wherein the ring gear is fixed and also engaged to a planet carrier housing driven by planet gears and coupled to a spindle configured to output to a wheel. A second example of the driveline, optionally including the first example, further includes where the first electric motor is operated independently of the second electric motor. A third example of the driveline, optionally including one or more of the previous examples, further includes where a first electric motor shaft is coaxial and spaced away from a second electric motor shaft, the first electric motor shaft is misaligned with an output axis of the first two-stage gear assembly, and wherein the second electric motor shaft is misaligned with an output axis of the second two-stage gear assembly. A fourth example of the driveline, optionally including one or more of the previous examples, further includes where a first wheel surrounds an outer perimeter of the first helical planetary gear assembly and a second wheel surrounds an outer perimeter of the second helical planetary gear assembly.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a first electric motor coupled to a first two-stage gear assembly, a second electric motor coupled to a second two-stage gear assembly and separated from the first electric motor, wherein each of the first electric motor and the second electric motor comprises a motor shaft that extends along a first axis, wherein the first and second two-stage gear assemblies comprise a first stage helical gear assembly and a second stage helical planetary reduction gear assembly, and wherein each of the gear assemblies comprises:
   a helical gear extending from the motor shaft to a sun shaft;
   a plurality of planet gears driven by the sun shaft; and
   a spindle coupled to a planet carrier housing that is connected to the plurality of planet gears, wherein the spindle drives a wheel that comprises a surface that is adjacent to and faces the first or second electric motor.

2. The system of claim 1, wherein the first stage helical gear assembly comprises a helical pinion, and wherein the helical gear is mounted on helical gear teeth of a sun gear.

3. The system of claim 2, wherein the helical gear extends normal to the first axis toward the sun shaft arranged on a second axis, wherein the second axis is parallel to and misaligned with the first axis.

4. The system of claim 3, wherein the sun shaft is coupled to the sun gear and is engaged with the plurality of planet gears.

5. The system of claim 4, wherein the planet gears are configured to rotate about planet pins, wherein the planet pins are fixed via snap rings and do not rotate.

6. The system of claim 5, wherein a ring gear is actuated via the planet gears.

7. The system of claim 6, wherein the ring gear is physically coupled to a ring gear support bolted to a fixed housing of the planet gears.

8. The system of claim 7, wherein the wheel surrounds an outer circumference of the first two-stage gear assembly or the second two-stage gear assembly.

9. An off-highway vehicle, comprising:
   a battery pack comprising a plurality of batteries;
   a motor unit electrically coupled to the battery pack;
   a first electric motor coupled to the motor unit via a first motor coupling;
   a second electric motor coupled to the motor unit via a second motor coupling, wherein the second electric motor and the first electric motor are separate from one another;
   a first two-stage gear assembly configured to receive power from an output gear of only the first electric motor; and
   a second two-stage gear assembly configured to receive power from an output gear of only the second electric motor; wherein
   each of the first two-stage gear assembly and the second two-stage gear assembly comprises:
   the output gear extends in a direction normal to an axis of a sun shaft, wherein the sun shaft is engaged with a plurality of planet gears;

a planet carrier housing engaged with the plurality of planet gears; and a spindle that is coupled to the planet carrier housing and configured to drive a wheel that comprises a surface that is adjacent to the first or the second electric motor.

10. The off-highway vehicle of claim 9, wherein the first electric motor outputs to a helical pinion of a first helical gear assembly of the first two-stage gear assembly.

11. The off-highway vehicle of claim 2, wherein the axis of the sun shaft is parallel to and misaligned with an axis of a motor shaft of the first electric motor.

12. The off-highway vehicle of claim 9, wherein the plurality of planet gears are arranged radially between the sun shat and a motor shaft of the first electric motor or the second electric motor.

13. The off-highway vehicle of claim 9, wherein a motor shaft extends parallel to the axis of the sun shaft, and wherein the motor shaft extends beyond a point at which the output gear engages with the sun shaft toward the wheel.

14. The off-highway vehicle of claim 9, wherein the first electric motor is mounted on only a first axle and the second electric motor is mounted on only a second axle, the first axle and the second axle aligned along a common axis and spaced apart from one another.

15. The off-highway vehicle of claim 2, wherein the first electric motor drives only a first wheel and the second electric motor drives only a second wheel.

16. A driveline of an off-highway vehicle, comprising:
a battery pack comprising a plurality of batteries;
a motor unit electrically coupled to the battery pack;
a first electric motor coupled to the motor unit via a first motor coupling;
a second electric motor coupled to the motor unit via a second motor coupling, wherein the second electric motor and the first electric motor are separate from one another;
a first two-stage gear assembly comprising a first helical gear assembly and a first helical planetary gear assembly, the first helical planet gear assembly configured to receive power from a first output gear of only the first electric motor, wherein the first output gear extends in a direction normal to a first axis of a first electric motor shaft and a second axis of a first sun shaft, the first sun shaft coupled to a first plurality of planetary gears, a first planet carrier housing coupled to the first plurality of planetary gears and to a first spindle, wherein the first spindle is configured to drive a first wheel that comprises a surface that is adjacent to the first electric motor; and
a second two-stage gear assembly comprising a second helical gear assembly and a second helical planetary gear assembly, the second helical planet gear assembly configured to receive power from a second output gear of only the second electric motor, wherein the second output gear extends in a direction normal to a first axis of a second electric motor shaft and a second axis of a second sun shaft, the second sun shaft coupled to a second plurality of planetary gears, a second planet carrier housing coupled to the second plurality of planetary gears and to a second spindle, wherein the second spindle is configured to drive a second wheel that comprises a surface that is adjacent to the second electric motor.

17. The driveline of claim 16, wherein the first helical planetary gear assembly and the second helical planetary gear assembly comprise planet gears engaged with a ring gear.

18. The driveline of claim 17, wherein the first electric motor is operated independently of the second electric motor.

19. The driveline of claim 18, wherein the first electric motor shaft is coaxial and spaced away from the second electric motor shaft, and wherein the first electric motor shaft and the second electric motor shaft overlap with a portion of a respective sun shaft.

20. The driveline of claim 16, wherein the first wheel surrounds an outer perimeter of the first planet carrier housing and the second wheel surrounds an outer perimeter of the second planet carrier housing.

* * * * *